US011584474B1

(12) United States Patent
Valdez

(10) Patent No.: US 11,584,474 B1
(45) Date of Patent: Feb. 21, 2023

(54) BICYCLE PROPULSION SYSTEM

(71) Applicant: Jorge Valdez, Albuquerque, NM (US)

(72) Inventor: Jorge Valdez, Albuquerque, NM (US)

(*) Notice: Subject to any disclaimer, the term of this patent is extended or adjusted under 35 U.S.C. 154(b) by 281 days.

(21) Appl. No.: 17/027,613

(22) Filed: Sep. 21, 2020

Related U.S. Application Data

(60) Provisional application No. 62/903,814, filed on Sep. 21, 2019.

(51) Int. Cl.
  *B62M 1/38* (2013.01)
  *B62M 9/16* (2006.01)

(52) U.S. Cl.
  CPC ............. *B62M 1/38* (2013.01); *B62M 9/16* (2013.01)

(58) Field of Classification Search
  CPC .......... B62M 1/38; B62M 9/16; B62M 1/105; B62M 1/36
  See application file for complete search history.

(56) References Cited

U.S. PATENT DOCUMENTS

| | | | |
|---|---|---|---|
| 5,121,654 A * | 6/1992 | Fasce | B62M 1/28 74/594.1 |
| 5,157,988 A * | 10/1992 | Pinkstock | B62M 1/105 74/68 |
| 5,324,057 A | 6/1994 | Chartrand | |
| 5,335,927 A | 8/1994 | Islas | |
| 6,053,830 A * | 4/2000 | Glaeser | B62M 1/105 474/69 |
| 6,554,309 B2 | 4/2003 | Thir | |
| 8,783,703 B2 | 7/2014 | Caspers | |
| 9,650,106 B1 * | 5/2017 | Singh | B62M 1/36 |
| 2011/0266768 A1 * | 11/2011 | Kohlheb | B62M 3/06 280/251 |
| 2012/0280466 A1 * | 11/2012 | Woods | B62M 1/36 474/148 |
| 2014/0171239 A1 * | 6/2014 | Yang | F16H 9/04 474/69 |
| 2014/0171241 A1 * | 6/2014 | Yang | B62M 1/105 474/71 |
| 2016/0288871 A1 | 10/2016 | Atil | |
| 2017/0334517 A1 * | 11/2017 | Zuniga | B62M 1/36 |

FOREIGN PATENT DOCUMENTS

| | | | | |
|---|---|---|---|---|
| WO | WO-9718123 A1 * | 5/1997 | | B62M 1/26 |
| WO | WO-9922981 A1 * | 5/1999 | | B62M 1/10 |
| WO | WO-2010121999 A1 * | 10/2010 | | B62M 1/36 |
| WO | WO-2012110988 A1 * | 8/2012 | | B60T 1/10 |
| WO | WO-2014190610 A1 * | 12/2014 | | B62M 1/105 |

OTHER PUBLICATIONS

Stringbike, website located at http://www.stringbike.com/.

* cited by examiner

*Primary Examiner* — Jacob D Knutson
*Assistant Examiner* — Ryan Edward Hardy
(74) *Attorney, Agent, or Firm* — Kameron W. Kramer

(57) ABSTRACT

A vehicle propulsion system for maximizing power output, comprising: a frame; a first crankset and second crankset securably attached to the frame; a first sprocket wheel and second sprocket wheel attached to the first crankset and second crankset; a first pedal arm and second pedal arm attached to the first crankset and second crankset each having a pedal; a first chain and second chain disposed on the first sprocket wheel and second sprocket wheel, and the chain connecting to a wire on one end and a spring and wire on the other end; and a series of springs and wires attached to the distal ends of the first chain and second chain and disposed on a series of pulleys and sprockets.

3 Claims, 4 Drawing Sheets

BICYCLE PROPULSION SYSTEM

CROSS-REFERENCE TO RELATED APPLICATION

This application claims the benefit of U.S. Provisional Patent Application Ser. No. 62/903,814 filed Sep. 21, 2019, titled "Bicycle with Pulley Retraction System" and the subject matter thereof is incorporated herein by reference thereto.

TECHNICAL FIELD

The present invention relates generally to bicycles, and in particular to a pedal powered unit with a novel propulsion system.

BACKGROUND ART

Bicycles have been around for over a hundred years. The traditional bicycle has two wheels attached to a frame and is pedal-driven. Of course, there are many variations on this, such as motorized bicycles, multiple gears, sturdy frames, light weight frames, thin wheels, thick wheels, etc. There are bicycles for many different purposes. Over the years, there have been many attempted improvements in the bicycle to accomplish various things, such as multiplying the power of the rider, increased speed, weight of the bicycle, etc.

There are many bicycles in the prior art that comprise levers mounted on the vehicle frame. U.S. Pat. No. 5,335,927, Islas, entitled "Pedaled Propulsion System" discloses such an invention. A chain engages the rotary members to provide reciprocal oscillatory motion, which is then converted to one-way rotary motion. Leverage type pedals have also been provided in the prior art, such as U.S. Pat. No. 6,554,309 B2, Third, entitled "Bicycle Pedaling Power Unit with Leveraging Shifting." U.S. Pat. No. 8,783,703 B2, Caspers, entitled "Mechanical Torque Multiplier and Evener Mechanism" provides a mechanical stroke multiplier to increase the distance over which the operator applies a force to the vehicle. U.S. Pat. No. 5,324,057, Chartrand, entitled "Two-Wheel Drive Cycle" discloses a two-wheel drive bicycle.

These patents all seek to provide a bicycle, or other manually powered wheeled vehicle, that improves on the traditional bicycle. However, the need still exists for a bicycle that actually multiples the power of the rider through the pedaling process.

The present invention provides a propulsion system that, when installed on a bicycle as shown in the present disclosure, overcomes many of the shortcomings contained in the prior art. The present invention multiplies the power output of a pedal powered vehicle or device, such as a bicycle, thus requiring less effort on the part of the rider. Additionally, the present invention does not have the same loss of power that is present in the prior art bicycles.

None of the prior art fully addresses the problems resolved by the present invention. The present invention overcomes these limitations contained in the prior art by providing a pulley retraction system for pedal powered vehicles that is sturdy, reliable, provides a high power output, and is easy to use.

DETAILED DESCRIPTION OF THE INVENTION

Figure 1:
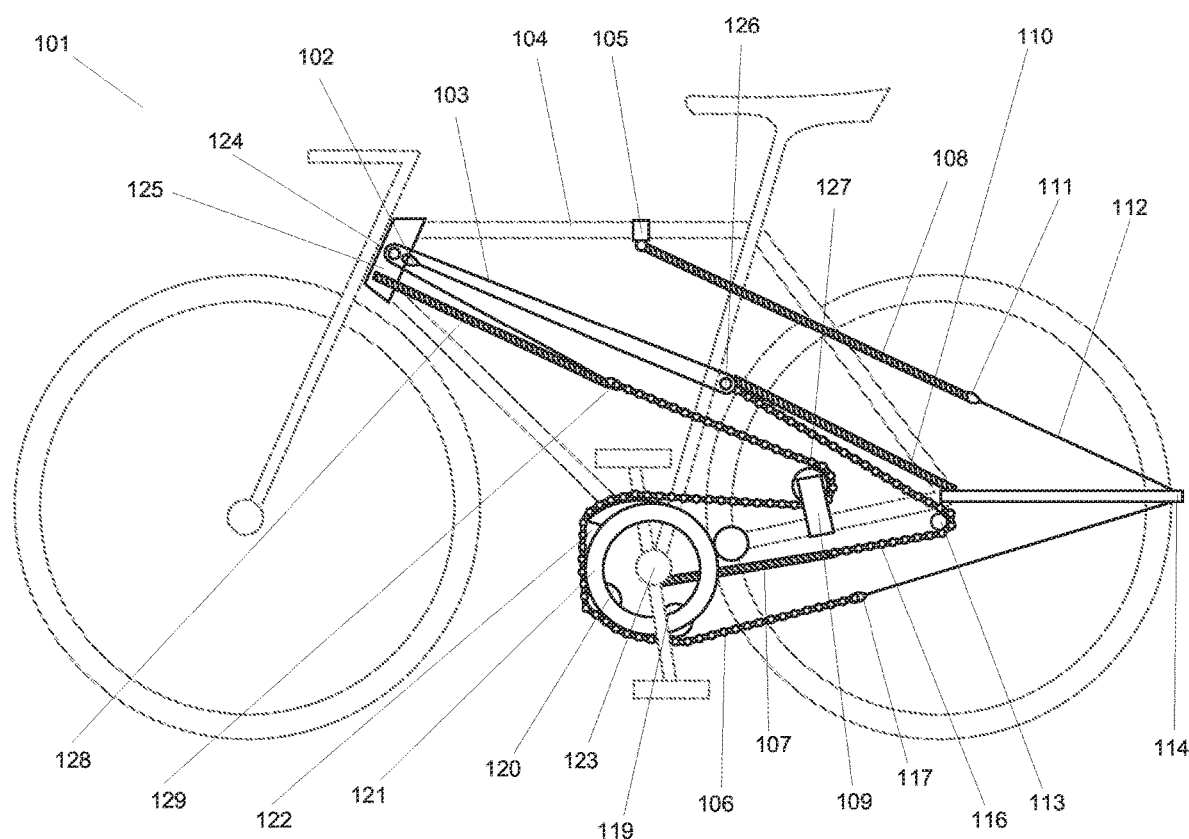
FIG. 1 illustrates a right side view of the bicycle of the present invention.

The best mode for carrying out the invention will be described herein. The following embodiments are described in sufficient detail to enable those skilled in the art to make and use the invention. It is to be understood that other embodiments would be evident based on the present disclosure, and that system, process, or mechanical changes may be made without departing from the scope of the present invention.

In the following description, numerous specific details are given to provide a thorough understanding of the invention. However, it will be apparent that the invention may be practiced without these specific details. To avoid obscuring the present invention, some well-known system configurations, and process steps are not disclosed in detail. The figures illustrating embodiments of the system are semi-diagrammatic and not to scale and, particularly, some of the dimensions are for the clarity of presentation and are shown exaggerated in the drawing figures.

The same numbers are used in all the drawing figures to relate to the same elements. Alternate embodiments have been included throughout, and the order of such are not intended to have any other significance or provide limitations for the present invention. It is noted that, as used in this specification and the appended claim(s), the singular forms "a," "an," and "the," include plural referents unless expressly and unequivocally limited to one referent. Thus, for example, reference to "a pulley" includes two or more different pulleys. As used herein, the term "include" and its grammatical variants are intended to be non-limiting, such that recitation of items in a list is not to the exclusion of other like items that can be substituted or other items that can be added to the listed items.

For expository purposes, the term "horizontal" as used herein is defined as a plane parallel to the plane or surface of the pulley retraction system, regardless of its orientation. The term "vertical" refers to a direction perpendicular to the horizontal as just defined. Terms, such as "above", "below", "bottom", "top", "side", "higher", "lower", "upper", "over", and "under", are defined with respect to the horizontal plane, as shown in the figures. The terms "right" and "left" when used to describe a bicycle are defined with respect to the bicycle when looking at the bicycle from the front.

Alternate embodiments have been included throughout, and the order of such are not intended to have any other significance or provide limitations for the present invention.

The present invention provides a propulsion system that, when installed on a bicycle as shown in the present disclosure, overcomes many of the shortcomings contained in the prior art. The present invention multiplies the power output of a pedal powered vehicle or device, such as a bicycle, thus requiring less effort on the part of the rider. Additionally, the present invention does not have the same loss of power that is present in the prior art bicycles.

With reference to FIGS. 1 through 4, both sides of the bicycle are shown in the respective drawings. Many parts may be the same or substantially the same on both sides. If there are two corresponding pieces that are separate pieces but the same just on the other side of the bicycle, the corresponding piece on the left side will be denoted with an apostrophe, for example, 108 and 108'. That means there are two of those pieces, and the views are not simply the two sides of one of those pieces, but the two pieces are virtually identical and service the same purpose. If the same number is used on two drawings, that means that it is the same piece and it is viewed from both left and right sides. For simplicity purposes, when viewing one side of the bicycle, the pieces on the other side are not shown even though they may in fact be visible.

The present invention provides a vehicle propulsion system for maximizing power output, comprising: a frame; a first crankset and second crankset securably attached to the frame; a first sprocket wheel and second sprocket wheel attached to the first crankset and second crankset; a first pedal arm and second pedal arm attached to the first crankset and second crankset each having a pedal; a first chain and second chain disposed on the first sprocket wheel and second sprocket wheel, and the chain connecting to a wire on one end and a spring and wire on the other end; and a series of springs and wires attached to the distal ends of the first chain and second chain and disposed on a series of pulleys and sprockets.

FIG. 1 illustrates a right side view of bicycle 101 of the present invention. Connection plates 105 and 125 are disposed on frame 104. Spring 108 is connected to connection plate 105 and the distal end of spring 108 is connected to wire 112 via connection point 111. Wire 112 is connected to connection point 111 and disposed on rear bar pulley 114. Wire 112 continues after rear bar pulley 114 and is attached to chain 106 via connection point 117. Sprocket 127 is attached to bicycle 101 via rear sprocket housing 109. Chain 106 terminates at connection point 129. Connection point 129 connects chain 106 and spring 128. Spring 128 is connected to connection plate 125. Wire 103 is connected at two ends, connection point 129 and connection plate 125 at connection point 102. Wire 103 is disposed on pulley 124, continuing to pulley 126, and culminating at connection point 102. Connection point 102 is attached to connection plate 125. Spring 110 is attached to rear bar 114 and pulley 126. Spring 107 is attached to crankset 123 and chain 116. Chain 116 is disposed on sprocket 113 and terminates at pulley 126. Spring 110 is disposed on rear bar 114 and terminates at pulley 126. Chain 106 is disposed on sprockets 119, 120, 122, and 127, and is attached at connection points 117 and 129. Sprockets 119, 120, and 122 are disposed on sprocket wheel 121. Crankset 123 is securably attached to sprocket wheel 121 and directly powers the rear wheel.

Figure 2:
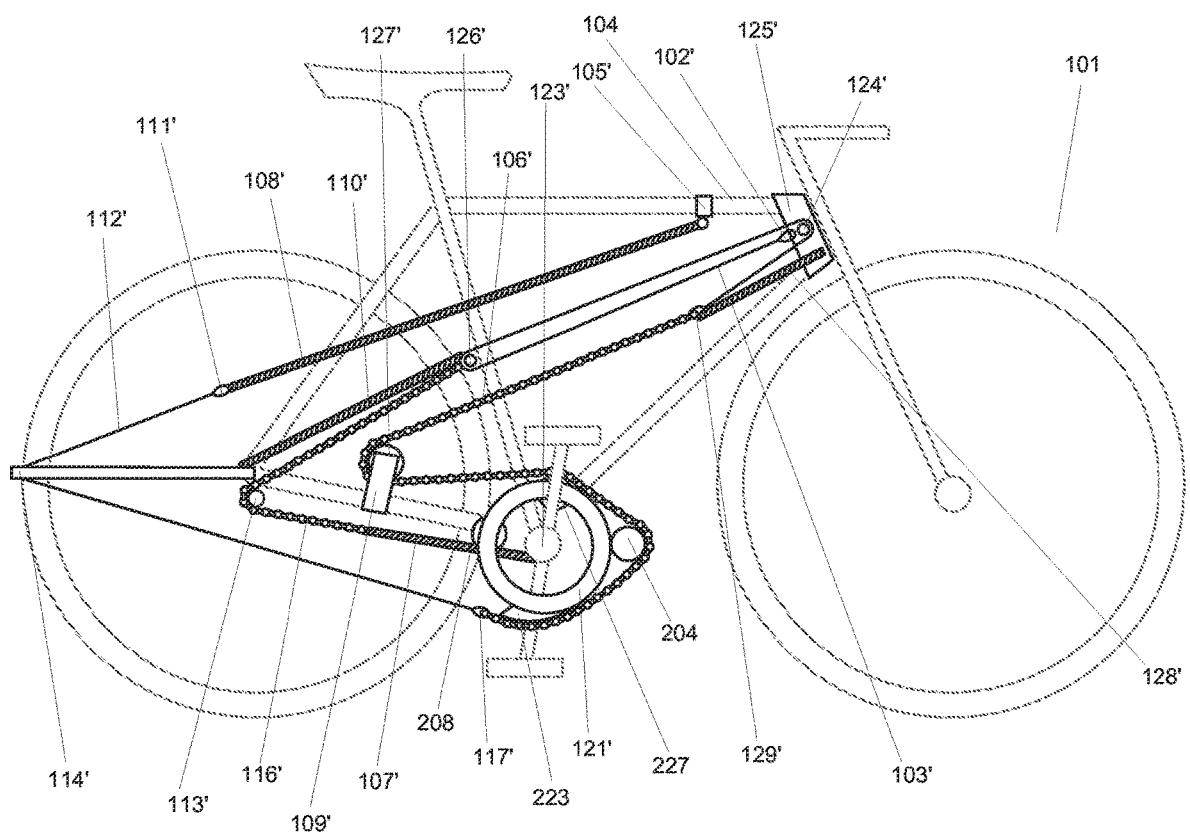
FIG. 2 illustrates a left side view of the bicycle of the present invention.

FIG. 2 illustrates a left side view of bicycle 101 of the present invention. Connection plates 105' and 125' are disposed on frame 104. Spring 108' is connected to connection plate 105' and the distal end of spring 108' is connected to wire 112' via connection point 111'. Wire 112' is connected to connection point 111' and disposed on rear bar pulley 114'. Wire 112' continues after rear bar pulley 114' and is attached to chain 106' via connection point 117'. Sprocket 127' is attached to bicycle 101 via rear sprocket housing 109'. Chain 106' terminates at connection point 129'. Connection point 129' connects chain 106' and spring 128'. Spring 128' is connected to connection plate 125'. Wire 103' is connected at two ends, connection point 129' and connection plate 125' at connection point 102'. Wire 103' is disposed on pulley 124', continuing to pulley 126', and culminating at connection point 102'. Connection point 102' is attached to connection plate 125'. Spring 110' is attached to rear bar 114' and pulley 126'. Spring 107' is attached to crankset 123' and chain 116'. Chain 116' is disposed on sprocket 113' and terminates at pulley 126'. Spring 110' is disposed on rear bar 114' and terminates at pulley 126'. Chain 106' is disposed on sprockets 223, 204, 227, and 127', and is attached at connection points 117' and 129'. Sprockets 204, 223, and 227 are disposed on sprocket wheel 205. Crankset 123' is securably attached to sprocket wheel 121' and directly powers the rear wheel.

When a rider is pedaling the bicycle 101 of the present invention, looking at the right side, chain 106 pulls spring 128 and wire 103. Wire 103 in turn provides tension on chain 116 and spring 110. Chain 106 also provides tension to wire 112. Wire 112 is disposed on rear bar pulley 114 and wire 112 pulls spring 108, which terminates at the frame 104 of the bicycle. Chain 116 pulls spring 107. Looking at the left side, chain 106' pulls spring 128' and wire 103'. Wire 103' in turn provides tension on chain 116' and spring 110'. Chain 106' also provides tension to wire 112'. Wire 112' is disposed on rear bar pulley 114' and wire 112' pulls spring 108', which terminates at the frame 104 of the bicycle. Chain 116' pulls spring 107'.

An alternate embodiment of the present invention provides a vehicle propulsion system for maximizing power output, comprising: A vehicle propulsion system for maximizing power output, comprising: a frame; a first crankset and second crankset securably attached to the frame; a first plate and second plate rotatably attached to frame; a first pedal arm and second pedal arm attached to the first crankset and second crankset each having a pedal; a first sprocket wheel and second sprocket wheel attached to the first plate and second plate; a first chain and second chain disposed on the first sprocket wheel and second sprocket wheel, and the first chain and second chain disposed on a forward sprocket and rear sprocket, and terminating on the frame; and a second chain disposed on the rear sprocket and the sprocket located on the rear axle.

Figure 3:
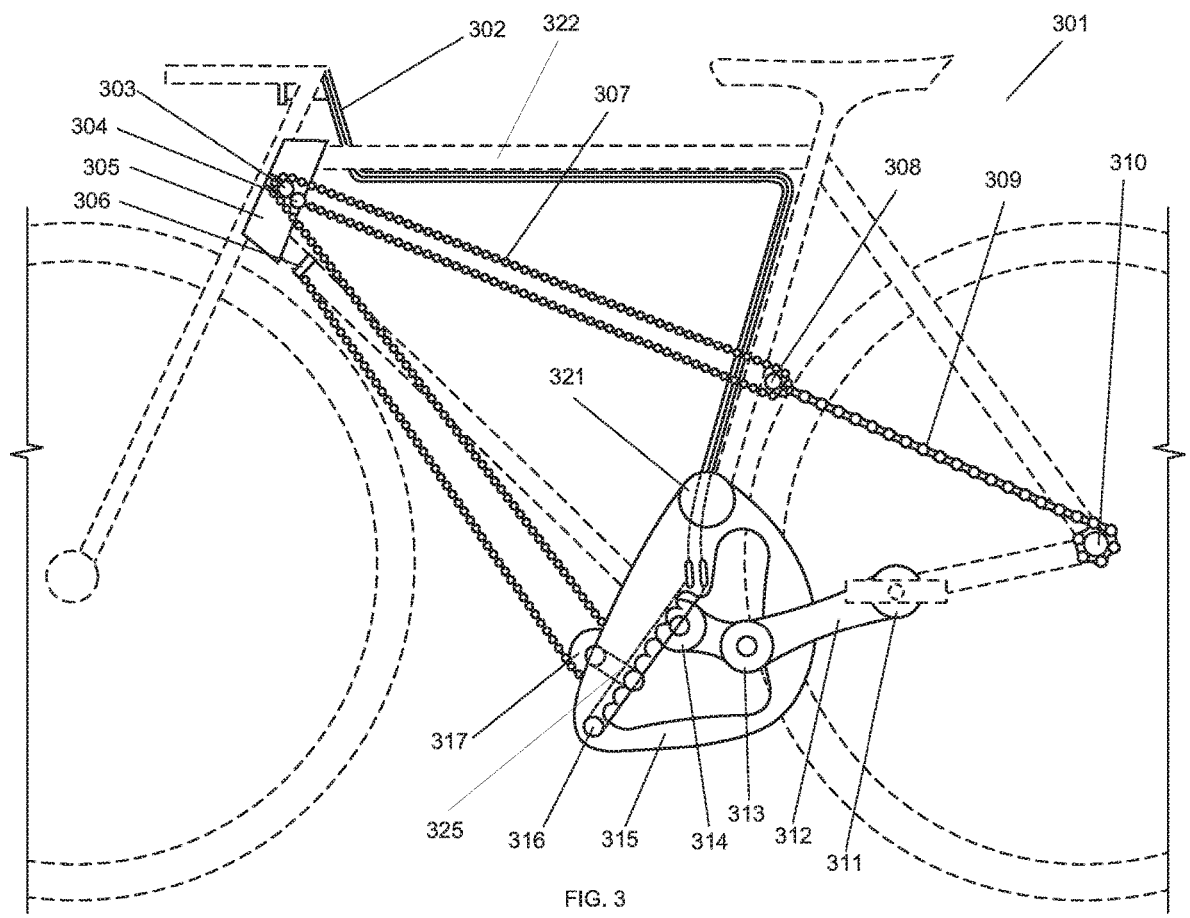
FIG. 3 illustrates a right side view of an alternate embodiment of the bicycle of the present invention.

FIG. 3 illustrates a right side view of an alternate embodiment of the bicycle 301 of the present invention. Connection plate 305 is disposed on frame 322. Chain 307 is connected to connection plate 305 via connection point 304 and the distal end of chain 307 is connected to connection plate 306. Sprocket 303 is disposed on connection plate 305. Chain 307 is disposed on sprockets 308, 303, and 317. Sprocket 308 may or may not be disposed on frame 322. Chain 309 is disposed on sprocket 310 and terminates at sprocket 308. Sprocket 317 is attached to plate 315 via connectors 325 and 316. Crankset 314 extends through the frame 322, and the pedal arm 312 is disposed on the crankset 314, with pedal 311 at the distal end of pedal arm 312. Plate rotator 313 is disposed on pedal arm 312. Plate 315 is rotatably attached to frame 322 via connection point 321. Connection point 321 allows plate 315 to rotate when the user is pedaling the bicycle to allow plate rotator 313 to move in a full 360 degree rotation while continuously maintaining contact with plate 315. Wires 302 are brake and gear change cables. As the bicycle is pedaled, sprockets 310, 308, and 317 maintain tension of chains 309 and 307. Sprocket 310 directly powers the rear wheel. Sprocket 310' is disposed on the rear axle.

Figure 4:
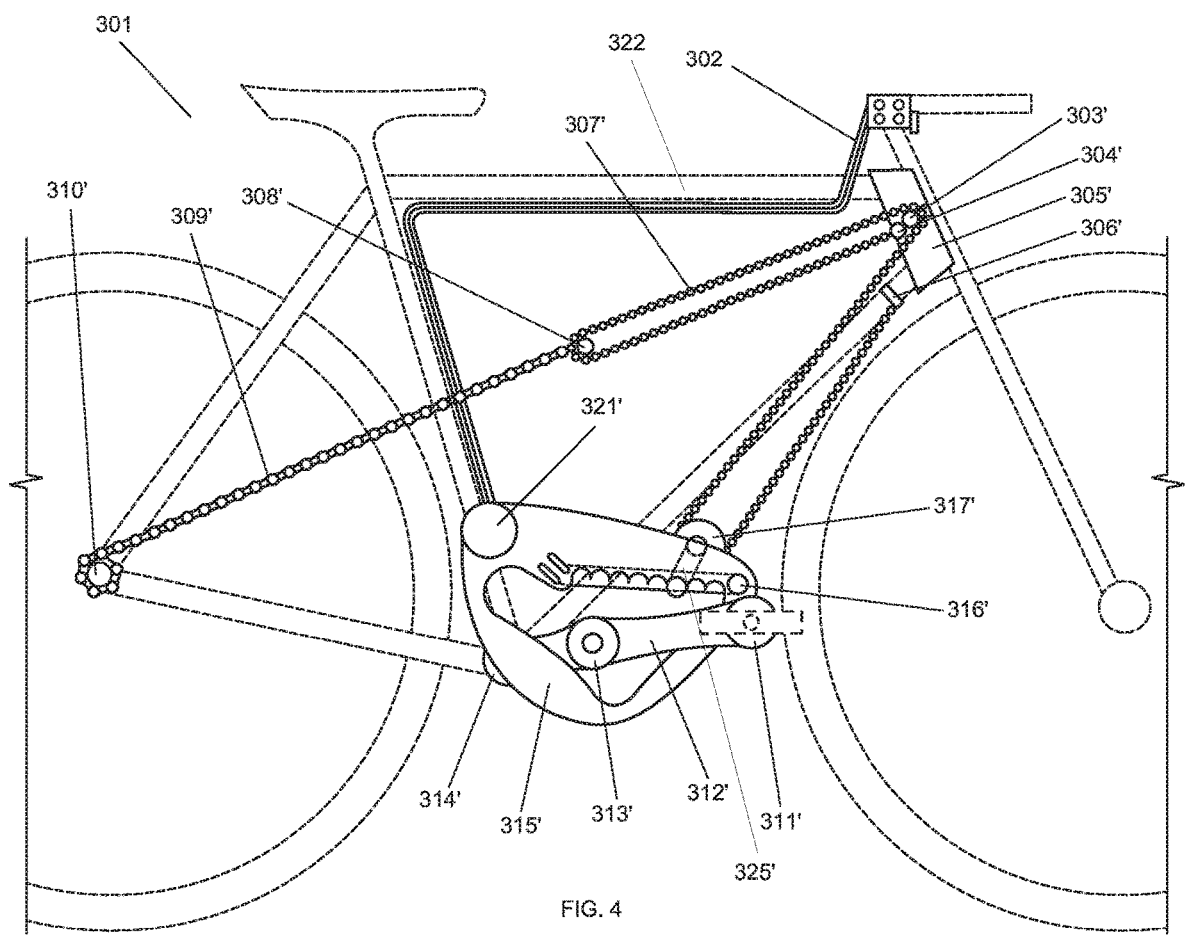
FIG. 4 illustrates a left side view of an alternate embodiment of the bicycle of the present invention.

FIG. 4 illustrates a left side view of an alternate embodiment of the bicycle 301 of the present invention. Connection plate 305' is disposed on frame 322. Chain 307' is connected to connection plate 305' via connection point 304' and the distal end of chain 307' is connected to connection plate 306'. Sprocket 303' is disposed on connection plate 305'. Chain 307' is disposed on sprockets 308', 303', and 317'. Sprocket 308' may or may not be disposed on frame 322. Chain 309' is disposed on sprocket 310' and terminates at sprocket 308'. Sprocket 317' is attached to plate 315' via connectors 325' and 316'. Crankset 314' extends through the frame 322, and the pedal arm 312' is disposed on the crankset 314, with pedal 311' at the distal end of pedal arm 312'. Plate rotator 313' is disposed on pedal arm 312'. Plate 315' is rotatably attached to frame 322 via connection point 321'. Connection point 321' allows plate 315' to rotate when the user is pedaling the bicycle to allow plate rotator 313' to move in a full 360 degree rotation while continuously maintaining contact with plate 315'. Wires 302 are brake and gear change cables. As the bicycle is pedaled, sprockets 310', 308', and 317' maintain tension of chains 309' and 307'. Sprocket 310' directly powers the rear wheel. Sprocket 310' is disposed on the rear axle.

The system of pulleys and sprockets provides additional power output of the bicycle, while minimizing the effort and exertion by the rider. Due to the additional pulleys and sprockets, this system does not have a power loss, so at each complete turn of the pedal, there is steady pressure due to the constant stretching and retraction of the various springs, wires, and chains.

All references to a pulley or pulleys refer to any size and type of pulley, including, but not limited to, single eye and double eye pulleys. A plurality of pulleys of any sort are used to maximize performance of the bicycle.

The bicycle of the present invention comprises any number, and type, of pulleys, chains, wires, sprockets, springs, and connection points, in any combination. Some of these features can be interchanged, removed, or added as desired. Additional materials or systems may be utilized to create the same effect of increased power and increased performance.

While two embodiments have been described and shown in the figures, additional embodiments are included in this disclosure, including, but not limited to, the addition or subtraction of pulleys, sprockets, chains, springs, and/or wires, along with additional features.

In one embodiment of the present invention, only one side of the bicycle has the pulleys, sprockets, chains, springs, and/or wires.

The pulley retraction system of the present invention is being used on a bicycle for the present invention. However, the pulley retraction system can be installed and utilized on other pedal-driven devices. The pulley retraction system can also be installed on non-pedal driven devices. In that instance, the pedals are replaced with a substitute mechanism that delivers the same, desired force to initiate the pulley-retraction system.

The best mode for carrying out the invention has been described herein. The previous embodiments are described in sufficient detail to enable those skilled in the art to make and use the invention. It is to be understood that other embodiments would be evident based on the present disclosure, and that system, process, or mechanical changes may be made without departing from the scope of the present invention.

Certain embodiments of the invention have other steps or elements in addition to or in place of those mentioned above. The steps or element will become apparent to those skilled in the art from a reading of the following detailed description when taken with reference to the accompanying figures.

In the previous description, numerous specific details and examples are given to provide a thorough understanding of the invention. However, it will be apparent that the invention may be practiced without these specific details and specific examples. While the invention has been described in conjunction with a specific best mode, it is to be understood that many alternatives, modifications, and variations will be apparent to those skilled in the art in light of the foregoing description. Accordingly, it is intended to embrace all such alternatives, modifications, and variations that fall within the scope of the included claims. All matters previously set forth herein or shown in the accompanying drawings are to be interpreted in an illustrative and non-limiting sense.

What is claimed is:

1. A vehicle propulsion system for maximizing power output, comprising:
   a frame;
   a first crankset and second crankset securably attached to the frame;
   a first sprocket wheel and second sprocket wheel attached respectively to the first crankset and second crankset;
   a first pedal arm and second pedal arm attached respectively to the first crankset and second crankset each having a pedal; and
   a first chain and second chain disposed on the first sprocket wheel and the second sprocket wheel, and the first chain connecting to a wire on one end and a spring and wire on the other end, and
   the spring and wire attached to the distal ends of the first chain and second chain and disposed on a series of pulleys and sprockets.

2. A vehicle propulsion system for maximizing power output, comprising:
   a frame;
   a first crankset and second crankset securably attached to the frame;
   a first plate and second plate rotatably attached to the frame;
   a first pedal arm and second pedal arm attached to the first crankset and second crankset each having a pedal;
   a first sprocket wheel and second sprocket wheel attached to the first plate and second plate; and
   a first chain and second chain disposed respectively on the first sprocket wheel and second sprocket wheel, and the first chain and second chain disposed on a forward sprocket and rear sprocket, and terminating on the frame, and
   the second chain disposed on the rear sprocket and the rear sprocket located on the rear axle.

3. The vehicle propulsion system according to claim 2, wherein both first pedal arm and second pedal arm are in direct contact with the first plate and second plate respectively.

* * * * *